United States Patent [19]

Donahoo

[11] 4,131,814
[45] Dec. 26, 1978

[54] CONCENTRATED WINDING SALIENT-POLE SHADED POLE MOTORS HAVING MULTIPLE SHORT CIRCUITED SHADING COILS FOR EACH POLE AND METHODS OF MAKING SAME

[75] Inventor: Joe T. Donahoo, Fort Wayne, Ind.

[73] Assignee: General Electric Company, Fort Wayne, Ind.

[21] Appl. No.: 688,251

[22] Filed: May 20, 1976

Related U.S. Application Data

[63] Continuation-in-part of Ser. No. 293,802, Oct. 2, 1972, Pat. No. 3,959,678.

[51] Int. Cl.² .................................................. H02K 17/00
[52] U.S. Cl. ........................................................ 310/172
[58] Field of Search ................. 310/172, 179, 180, 41, 310/51, 211, 214, 216, 218, 166, 184, 40; 318/223, 208

[56] References Cited

U.S. PATENT DOCUMENTS

| | | | |
|---|---|---|---|
| 2,773,999 | 12/1956 | Morrill | 310/172 |
| 2,810,845 | 10/1957 | Howes | 310/172 |
| 2,975,311 | 3/1961 | Suhr | 310/172 |
| 3,158,769 | 11/1964 | Morrill | 310/172 |
| 3,313,965 | 4/1967 | Arnold | 310/172 |
| 3,634,707 | 1/1972 | Tillner | 310/172 |
| 3,697,842 | 10/1972 | Morrill | 310/172 |
| 3,973,154 | 8/1976 | Broadway | 310/184 |

FOREIGN PATENT DOCUMENTS 1495926  9/1967  France .................................... 310/172

*Primary Examiner*—R. Skudy
*Attorney, Agent, or Firm*—Ralph E. Krisher, Jr.

[57] ABSTRACT

Salient-pole shaded pole motors with multiple short circuited shading coils on each pole piece are disclosed wherein the pole pieces extend generally radially from the geometric center of the magnetizeable yoke. The pole pieces are interconnected by a magnetic yoke that encompasses the pole pieces as well as a rotor. Adjacent pole tips of pole pieces are displaced in space from one another and are separated by air gaps. Among other things, this facilitates placement of concentrated winding means about the pole pieces. The leading edges or pole tips of the pole pieces exhibit a relatively high reluctance as compared to the center portion or region of the pole pieces. Also disclosed are methods of making multiple shading coil motors.

10 Claims, 9 Drawing Figures

CONCENTRATED WINDING SALIENT-POLE SHADED POLE MOTORS HAVING MULTIPLE SHORT CIRCUITED SHADING COILS FOR EACH POLE AND METHODS OF MAKING SAME

CROSS REFERENCE TO RELATED APPLICATIONS

This application is a continuation-in-part of my co-pending and now allowed application Ser. No. 293,802 which was filed on Oct. 2, 1972 and which issued as U.S. Pat. No. 3,959,678 on May 25, 1976. The entire disclosure of my application Ser. No. 293,802 is incorporated herein by reference.

BACKGROUND OF THE INVENTION

This invention relates to dynamoelectric machines and, more particularly, to salient-pole, shaded pole motors having concentrated windings disposed around circumferentially spaced apart pole pieces that each have a leading pole tip separated by an air gap from the trailing pole tip of the pole piece adjacent thereto.

Shaded pole motors of the concentrated winding, salient-pole variety, are one of the less expensive types of motors to manufacture. Accordingly, this type of motor is usually selected for alternating voltage applications whenever the heretofore known operating characteristics (in terms of starting torque, maximum or break down torque, running torque, dip torque, efficiency, etc.) of this type of motor will meet the needs of an intended application.

If one or more operating characteristics of this type of motor is not satisfactory for a given application, however, distributed wound motors will normally be used. Generally speaking, distributed wound motors are more expensive to manufacture than shaded pole motors. In addition, mechanical duty distributed wound motors utilize approaches such as selectively energizeable auxiliary winding arrangements so that desired operating characteristics can be achieved. For example, increased starting or locked rotor torque, efficiency, and so forth can be realized with these more expensive motors as compared to prior salient-pole shaded pole motors of similar overall physical size.

Shaded pole motors of the concentrated winding salient-pole variety, when designed to be relatively efficient during operation (e.g., those having efficiencies of 35% to 40% and greater) have relatively low starting torques. For example, when motors of this type have an operating efficiency in the neighborhood of 40% or more, the ratio of starting or locked rotor torque to maximum torque seems invariably to be about 0.33 or less. This is one of the primary reasons why the use of shaded pole motors has been generally limited to applications for driving fans and other fluid moving devices such as pumps. In many of these applications, the needed locked rotor torque is a relatively small fraction of the desired maximum torque or running torque (expressed as a percentage of maximum torque); although in some specific fan applications, the locked rotor torque may have to be in the neighborhood of one-half of the rated running torque.

In the more efficiently designed concentrated winding salient-pole shaded pole motors of which I am aware, pole pieces project radially from a magnetizeable yoke. In addition, the pole tips of adjacent ones of such pole pieces are spaced apart by air gaps (as shown, for example, in Arnold U.S. Pat. No. 3,313,965) and thus are not interconnected with magnetic material. With designs of this general type, changes that increase efficiency (for a given dip to maximum torque ratio) will decrease the ratio of locked rotor torque to maximum torque. On the other hand, for a given locked rotor torque and maximum torque, any further improvement in efficiencies causes, expectedly, a decease in dip torque (DT).

While a reduction in dip torque may be generally undesirable, it may become intolerable (because of loss of motor stability) in motors designed with tapped windings and intended for multispeed operation. For example, while a multispeed salient-pole shaded pole motor may be stable for high speed fan operation; when the motor is energized for low speed operation, it will not come up to speed if the dip torque is less than the amount of torque needed to accelerate the fan or other load past the speed associated with the dip torque of the motor. However, for a given locked rotor torque and maximum torque, any increase in stability associated with increased dip torque causes a reduction in operating efficiency with prior art approaches.

It therefore should now be understood that it would be advantageous and desirable to provide new and improved salient-pole shaded pole motors having winding coils concentrated about radially disposed pole pieces; such motors having characteristics that would not make it necessary (among other things) to sacrifice efficiency for increased locked rotor torque to maximum torque ratios for a given dip torque to maximum torque ratio. It would also be of importance to provide new and improved salient-pole shaded pole motors with characteristics that would permit the use of this type motor in so-called mechanical duty applications where the more expensive types of induction motors (with auxiliary starting devices) have been used heretofore. Two general examples of this type of application is the business machine field and electric motor driven gear reducer fields. It also would be desirable to provide a way to increase the efficiency of small fan motors.

Accordingly, it is an object of the present invention to provide new and improved concentrated winding salient-pole shaded pole motors that have higher efficiencies than were known heretofore, and that have greatly improved locked rotor torque characteristics.

It is another object of the present invention to provide new and improved motors of the just mentioned type wherein the inter-relationships between various characteristics such as dip torque, locked rotor torque, maximum torque, and current or power requirements are basically different as compared to motors of the same type known heretofore.

Still another object of the present invention is to provide new and improved salient-pole shaded pole motors wherein the above and other objects may be fulfilled without necessarily making drastic increases in the physical size of motors of a given power rating.

SUMMARY OF THE INVENTION

The above and other objects are carried out, in one preferred form, in motors having rotor and stator assemblies. The stator assemblies include laminated cores that have a magnetic yoke and pole pieces, the tips of which are separated by non-magnetic material, e.g. air gaps. Multiple short circuited shading coils are provided on the trailing pole tip of each pole piece that in turn extends generally radially from the geometric center of the magnetizeable yoke. This yoke magnetically interconnects the pole pieces.

In exemplifications of the invention illustrated herein, the leading pole tip of each pole piece is separted by an air gap from the trailing pole tip of the pole piece adjacent thereto. Among other things, these air gaps facilitate the placement of windings about the pole pieces. In addition, there is less iron in the magnetic circuit (from the rotor to the pole piece) relative to the amount of air in such circuit along the leading pole tip of each pole piece, as compared to the relative amounts of iron and air along the center portion of the pole pieces. In other words, the leading edges or pole tips of the salient-pole pieces exhibit a relatively higher reluctance as compared to the center portion or trailing tips of the pole pieces. This is accomplished in illustrated embodiments with chamfered bore defining surfaces — an approach that, by itself, is known in the art. The trailing tip of each pole piece is arranged to accommodate at least two short circuited shading coils and each trailing tip is spaced from the leading pole tip of an adjacent pole piece so that there will be substantially no magnetically permeable material forming a bridge between such adjacent pole tips.

A plurality of turns of conducting material are concentrated adjacent to each of the pole pieces. The concentrated winding turns, stator core, shading coils and other necessary parts such as a housing, bearing support, and so forth, together comprise the stator assembly. The rotor assembly, which includes a shaft, is supported for rotation relative to the stator assembly.

Numerous advantages can accrue from practicing the present invention. For example, it is now possible to construct motors of the above referred to type having locked rotor torque to maximum torque ratios in excess of values that were previously thought to be limiting values for motors with efficiencies in excess of 40%. Moreover, motors embodying the invention are relatively stable, i.e. they can be selected to have satisfactory dip torque to maximum torque ratios. Alternatively, my teachings may be followed to provide motors having greater locked rotor torque (for a stated maximum torque) without necessarily being penalized in terms of reduced efficiency. Accordingly, salient-pole, shaded pole motors may now be designed for various mechanical duty applications where more expensive induction motors have been used heretofore; or for improved efficiency applications.

The subject matter which I regard as my invention is particularly pointed out and distinctly claimed in the concluding portion of this specification. The invention itself, however, together with further objects and advantages thereof may be better understood by reference to the following description taken in connection with the accompanying drawings.

BRIEF DESCRIPTION OF THE DRAWINGS

FIG. 6 is a plot of gross efficiency at 70% of maximum torque versus the ratio of locked rotor torque to maximum torque;

FIG. 7 is a plot of watts input per watt output at 70% of maximum torque load versus the ratio of locked rotor torque to maximum torque (LRT/MT);

FIG. 8 is a plot of main winding copper loss per watt output at 70% of maximum torque versus LRT/MT; and FIG. 9 is a plot of locked rotor input watts per watt output at 70% of maximum torque versus LRT/MT.

DESCRIPTION OF THE PREFERRED EMBODIMENTS

Figure 1:
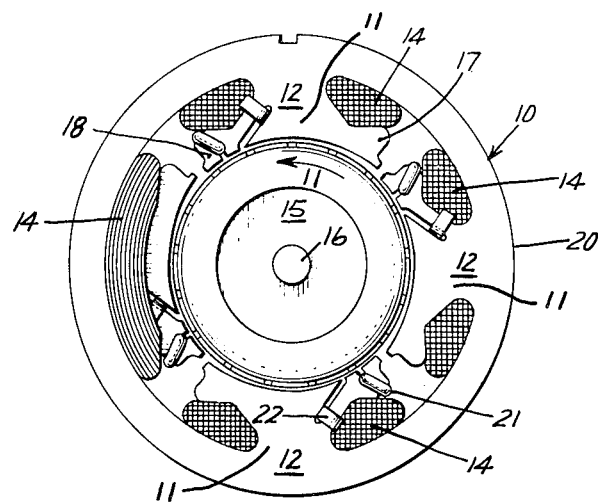
FIG. 1 is an end elevation of a salient-pole shaded pole motor, with parts removed and parts in section, embodying the invention in one form.

Referring now to the drawings, and particularly to FIG. 1, I have illustrated a salient-pole shaded pole motor 10 that includes a stator assembly, rotor assembly, and not shown bearing means as well as associated supporting structure.

The stator assembly includes a magnetic core formed of a plurality of magnetizeable laminations that define a magnetizeable yoke and a plurality of spaced apart pole pieces. The stator assembly also includes a plurality of turns of conductor wire disposed about a portion 11 of each of a plurality of substantially identical pole pieces 12. The portions 11 extend generally radially from the geometric center of the stator core which, for the motor of FIG. 1, also lies along the center or axis of rotation of the rotor.

The winding coils 14 about each pole piece are substantially identical in terms of conductor size and number of turns. These coils are interconnected in conventional manner so that when not shown external shown leads (connected to the ends of the winding comprised of the coils 14) are connected to a suitable source of excitation voltage, the rotor 15 will turn in a direction indicated by the arrow A, i.e., from the leading pole tips 17 toward the lagging or trailing pole tips 18.

For simplicity of description and clarification of illustration, parts of the complete motor 10 have not been illustrated and will not be further described except to note that the motor 10 also includes stationary structure for supporting the stator core 20. There also is included one or more bearing supports by means of which one or more bearings are positioned to journal the shaft 16 for rotation. It is also noted that the motor 10 may be of either the unit bearing or dual bearing type.

The body of rotor assembly 15 may be formed in any conventional manner and, preferably, is comprised of a stack of laminations formed from the same type of magnetizeable low carbon iron or steel as the laminations of the stator core 20. All of the motors illustrated herein were constructed from laminations that were about 0.025 inches thick. The rotor laminations have slots formed therein for accommodating the bars of a short circuited squirrel cage winding. These bars and associated end rings 17 may readily be formed of aluminum in a die casting process.

The leading pole tips 17 of each of the pole pieces 12 is chamfered so that the air gap flux density under the leading pole tips, as compared to the air gap flux density at the center of each of the pole pieces 12, is reduced.

With the illustrated structure, the relatively less iron in the magnetic circuit in the vicinity of the leading pole tips, as compared with the amount of air, provides the desired differential air gap flux density. Other approaches may also be used to accomplish this result. For example, other approaches would be to provide a stepped bore, or reluctance slots in the leading pole tips so as to establish high reluctance leading pole tips.

Pairs of shading coils 21, 22 are accommodated on the trailing pole tip 18 of each pole piece 12. These coils 21, 22 are disposed in slots 23, 24 formed in each of the salient-pole pieces. The relationship, shape, and configuration of the slots 23 and 24 are most clearly revealed in FIG. 2 which shows the core 20 with all windings and shading coils removed therefrom.

It will be noted that the slots 23 in the trailing pole tips 18 have been configured to accommodate a round shading coil whereas the slots 24 are formed to accommodate a rectangular shaped shading coil. The shapes of these coils have been selected on the basis of convenience and manufacturability. The actual cross-sectional area of the coils for slots 23, 24 are selected so that the shading coils will have an electrical resistance that is preselected for a given application. The material out of which the shading coils will be constructed may also be chosen on the basis of economics, ease of manufacture, and efficient utilization of the space available on a given core for accommodating the shading coils.

Figure 2:
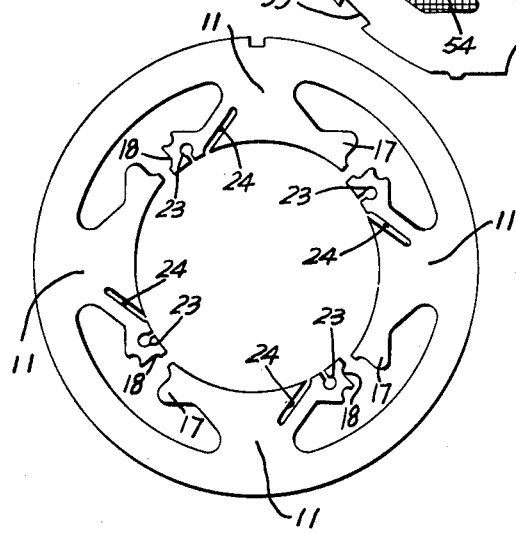
FIG. 2 is a plan view of one of the stator laminations of the motor shown in FIG. 1.

A four-pole salient-pole construction is illustrated by FIGS. 1 and 2. However, advantages of the present invention may also be realized with two-pole, six-pole and other multiple-pole constructions.

Figure 4:
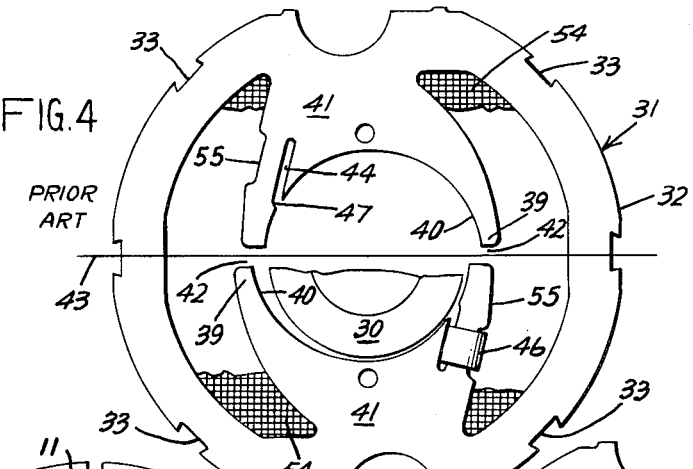
FIG. 4 is an end elevation, with parts removed, broken away, and in section, of a prior art motor.
Figure 3:
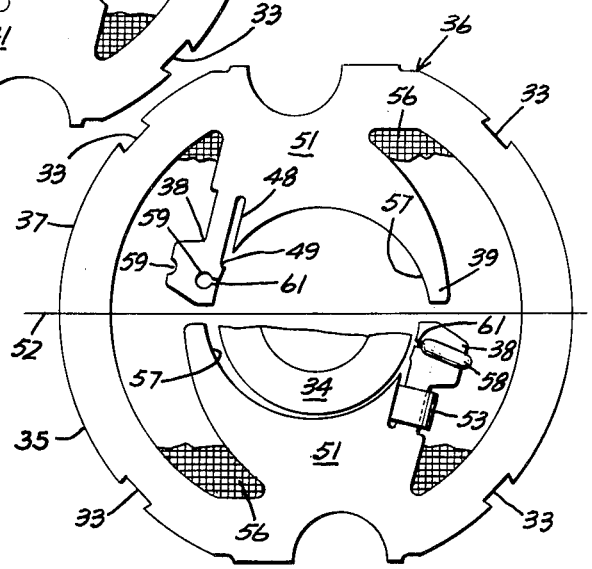
FIG. 3 is a view, with parts in section, parts broken away, and parts removed, of another motor embodying the present invention.

The advantages that may be obtained by use of the present invention will be best appreciated from the description now to be presented of the motors depicted by FIGS. 3 and 4, it being noted that portions of each of these motors have been removed, broken away, or shown in section for purposes of description. It is to be understood however, that motors depicted by FIGS. 3 and 4 have been constructed and tested for purposes of comparison.

The prior art motor depicted by FIG. 4 has been available commercially from the assignee of this application for more than a year prior to Oct. 2, 1972. This motor, designated by reference numeral 31, includes a rotor assembly formed of a 2 inch stack of laminations. The rotor body was constructed with 18 uniformly spaced apart die cast aluminum conductor bars and end rings. The fundamental calculated resistance of the rotor 30, referred or reflected to the main winding was about 4.75 ohms.

The stator core 32 was also a two inch stack of laminations that were held together by keys that were retained in keyways 33 formed in the magnetizeable yoke portion of the laminations.

The rotor 34 of motor 36 shown in FIG. 3 was substantially identical to rotor 30 and core 37 of motor 36 was substantially identical to core 32 with the exception that two keyways and two winding pin accommodating holes in the magnetizeable yoke portion 35 of the stator laminations were omitted. Essentially, the only other structural difference between motors 31 and 36 were those differences observed when the trailing pole tips 55, 38 are compared in FIGS. 3 and 4.

Essentially all other construction details of motors 31 and 36 were the same. For example, available bearing supports and bearing structures of the same size and type were used to support the rotors 30, 34 for rotation relative to the respective stator cores 32 and 37. All of this is here pointed out so that the totally unexpected differences in performance and characteristic relationships that become apparent after testing motors embodying the invention will be better appreciated.

The outline of the cores shown at 32 and 37 were each drawn to substantially full scale in the accompanying drawings so as to correspond in size and geometric configuration to the size and configuration of the stator laminations in motors that were actually constructed and tested, all as will be pointed out in a discussion of data presented in Table I hereinbelow.

Considering FIGS. 3 and 4 now in detail, and with initial reference to FIG. 4, the leading pole tip 39 of each of the pole pieces 41 were chamfered at 40 for a span of 80 electrical degrees as illustrated. The radial depth of the chamfer was about 0.08 inches, measured on the centerline of wire admitting slots 42. This centerline is represented in FIG. 4 by reference line 43.

Pole pieces 41 were also provided with slots or notches 44 in each of which a copper shading coil 46 was accommodated.

The center of opening 47 for shading coil slot 44 was 30 electrical degrees measured from reference line 43 and thus each coil 46 shaded 30° of the total span of the magnetic pole established by pole piece 41. The size and position of slots 48 (and openings 49 in pole pieces 51 of core 37) relative to center reference line 52 were the same as the relations just discussed for core 32. Moreover, the two coils 46 and two coils 53 were all formed of uninsulated copper conductor that was 0.281 inches wide and 0.05 inches thick.

Disposed about each of the pole pieces 41 and 51 was a coil of winding turns. Each of the coils 54 and each of coils 56 comprised 125 turns of 0.0359 inch (conductor diameter) insulated copper wire. Substantially the only difference between the windings for motors 31 and 36 was that the winding resistance of motor 31 was about 1.6 ohms whereas the winding resistance of motor 36 was about 1.7 ohms. This however, was caused by the need to have slightly increased lengths of wire for those turns in the vicinity of pole tips 38 of motor 36 as compared to the lengths of wire in the turns adjacent to pole tips 55 of motor 31.

Since the chamfer 57 was substantially the same, both in span and depth, as chamfer 40, the only other difference between motors 31 and 36 was that motor 36 included additional shading coils 58, each of which were carried on an enlarged pole tip 38 in a slot pair 59. The coils 58 were formed of No. 9AWG uninsulated copper conductor, the wire diameter being about 0.1144 inches. The tips 38 were enlarged (relative to tips 55 of motor 31) an amount sufficient to prevent magnetic saturation of the laminations under coils 58 due to the shading coil flux. The span of shading coils 58, i.e., the arcuate measure from reference line 52 to the center of opening 61 was 18 electrical degrees, it being noted that (as is well-known) electrical degrees are equal to mechanical degrees for two-pole motors.

A motor 36 was then tested, and the test data was recorded and then compared with test data for motors like motor 31. The tests were performed with a reaction dynamometer while the shaft of the motor being tested was coupled to the shaft of a direct current motor. The speed of motor 36 was very precisely controlled by varying the speed of the d.c. motor which, in effect, acted as a fixed speed driven device. A tachometer on the d.c. motor provided a speed signal while strain gauges provided a signal that was indicative of test motor torque for various speeds. Sensors were also used to determine current (in amperes) and power (in watts) drawn or used by the test motor under various load conditions.

Three motors were constructed as exemplified by motor 36 and the average data for these three motors, after testing, is reported in column B of Table I, while column A reports data obtained by corresponding tests of a motor constructed as described for motor 31. In Table I, the load condition and characteristic investigated is listed on the left-hand side of the table while recorded, observed, and calculated quantities appear in column A and B.

Table I

|  | A | B |
|---|---|---|
| Winding Resistance, ohms | 1.552 | 1.674 |
| Test Voltage, 60 Hz | 115 | 115 |
| Main Winding I$^2$R (heating) loss, watts | 41.64 | 43.13 |
| No Load Condition | | |
| Speed, rpm | 3516 | 3531 |
| amps | 5.18 | 5.08 |
| watts | 233 | 249 |
| Max Torque Condition | | |
| Speed, rpm | 2720 | 2793 |
| (MT) Torque, oz-ft | 8.25 | 8.47 |
| Current, amps | 7.20 | 6.71 |
| Power Input, watts | 534 | 540 |
| .7 Max Torque Condition | | |
| (EFF) Gross Efficiency, % | 41.8 | 43.5 |
| Speed, rpm | 3188 | 3234 |
| (.7MT) Torque, oz-ft | 5.78 | 5.93 |
| Current, apms | 5.80 | 5.47 |
| Power Input, watts | 391 | 391 |
| Dip Torque Condition | | |
| (DIP) Minimum torque, oz-ft | 3.66 | 3.47 |
| Locked Rotor Condition | | |
| (LRT) Torque, oz-ft | 2.52 | 3.38 |
| Current, amps | 9.68 | 8.92 |
| Power Input, watts | 667.5 | 669 |
| Calculated Ratios | | |
| DIP/MT | .444 | .409 |
| LRT/MT | .305 | .399 |
| .7MT Eff., % | 41.8 | 43.5 |

Figure 5:
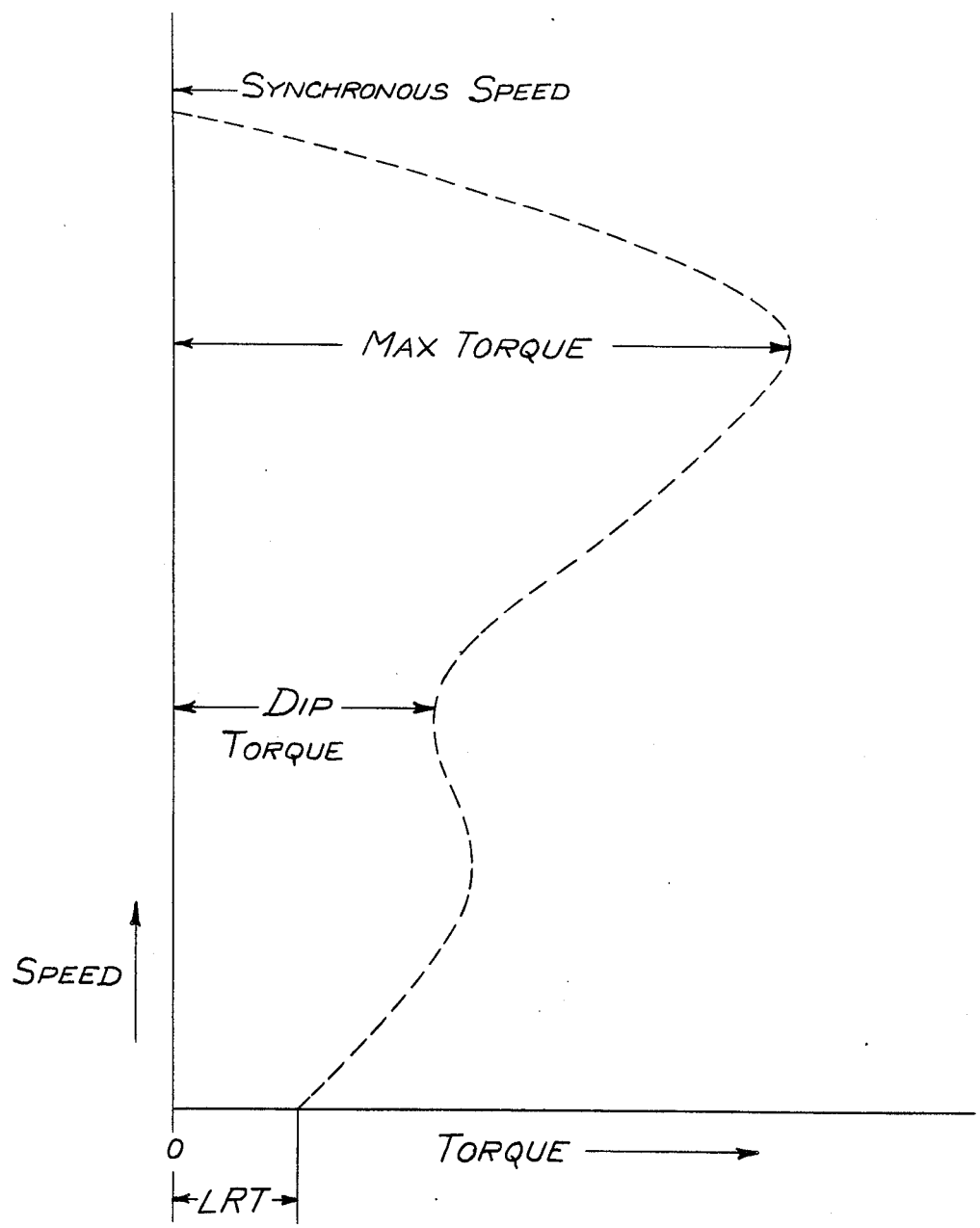
FIG. 5 is a plot of speed versus torque for motors of the general type described herein.

It is believed that much of the data in Table I is self-explanatory. However, FIG. 5 of the drawings is a typical speed-torque curve for salient-pole shaded pole motors, and is presented as an aid to understanding the data of Table I. The subheading "No Load" refers to a test condition when the motor being tested was operating at no load or maximum speed conditions. "Max Torque" refers to the maximum torque (also referred to as breakdown torque) point on the curve of FIG. 5; "Dip Torque" refers to the similarly labeled minimum torque region of the FIG. 5 curve; "0.7 Max Torque" would represent a condition where a load was applied to a test motor so that it operated at a speed between maximum speed and maximum torque speed and on a point on the FIG. 5 curve corresponding to 70% of maximum torque. As a final point of explanation, "Gross Efficiency" as used herein is calculated or measured to include output power used to overcome bearing friction as part of the useful output power of the motor, and is defined as watts output per watts input × 100.

The data of Table I indicates that the motors embodying the invention had several surprising and significantly improved operational characteristics as compared to the prior art. For example, the no-load speed is higher than for the prior art motor 31. Even more significantly however, the max. torque speed and max. torque were both increased while max. torque current decreased. The fact that max. torque power input was greater in column B than in column A indicates that the power factor of motors like motor 36 are closer to unity than was the case for motor 31 — and this is also a desirable feature.

Of even more significance, although column B dip torque is about 5% less than that of column A, the starting or locked rotor torque recorded in column B is at least ⅓ or 33% greater than the torque recorded in column A.

A comparison of the calculated ratios in Table I even further emphasizes the significant and surprising differences between motors 31 and 36. Motors like motor 36 had an LRT/MT (locked rotor torque to maximum torque) ratio above 0.33 while being 43.5% efficient and also while being relatively stable as evidenced by the calculated value of the ratio "DIP/MT".

Heretofore it has appeared that compromise must be made, in shaded pole motor designs, between any need for efficiencies greater than 35% and any need for LRT/MT ratios in excess of 0.33. For example, skeleton type motors (as shown for example in Ballentine U.S. Pat. No. 2,454,589) may be optimized (by using multiple shading coils and chamfered pole faces) to have LRT/MT ratios in excess of ⅓; but the efficiency of such motors would be only about 35% at best.

Motors as shown in FIG. 4 herein on the other hand may be optimized in design to have efficiencies in the neighborhood of 50%, but only at the expense of ever reducing LRT/MT ratios from an upper limit of about ⅛.

Because of the improvement in performance of motors like motor 36, which was surprising to an unexpected degree, a quantity of other motors embodying the invention were constructed and tested in the manner described above. All of these additional motors were of salient-pole shaded pole type. Moreover, to limit the number of variables, each had: a double shading coil trailing pole tip design; the same winding in terms of conductor size and number of turns; the same core stack height; a high reluctance leading pole tip that was stepped rather than chamfered; the same rotor stack height; the same rotor end ring; and the same basic stator core lamination design. The stator core laminations were varied, one from another, by providing variations in the: spans for the step in the leading pole tips; depths for the steps in the leading pole tips; span of the larger shading coils; span of the smaller shading coils; conductor size of the larger shading coils; and conductor size of the smaller shading coils. In addition, the size of the rotor conductors (and therefore rotor resistance) was varied.

The data obtained from testing these motors was then used to establish a mathematical model and the model employed, in turn, to establish points for various curves which are presented in FIGS. 6, 7, 8 and 9. The data obtained from the motors actually constructed of course verified the solid line curves in these figures. Before describing the significance of these curves, it should be noted that further variations could be made in salient-pole, shaded pole motors embodying the invention that would result in motor efficiencies in the neighborhood of 50% or locked rotor torque to maximum torque ratios in excess of 0.6 with efficiencies of 40% or more, all as will be explained hereinafter. For example, salient-pole, shaded pole motors have now been constructed with an efficiency of 39% and an LRT/MT ratio of 0.6.

Turning now to FIGS. 6, 7, 8, and 9; the broken line curves represent characteristic relationships associated with prior art salient-pole shaded pole motors typified, for example, by motor 31 of FIG. 4. The solid line curves in FIGS. 6–9 are plots that represent characteristic relationships associated with motors embodying my invention as discussed above.

A brief review of these curves quickly indicates that motors embodying the invention will have operating characteristics or properties that provide significant advantages. For example (refer to FIG. 6), salient-pole shaded pole motors now can have LRT/MT ratios well in excess of ⅓ with efficiencies of 40% and more when providing 70% of maximum torque.

Figure 6:
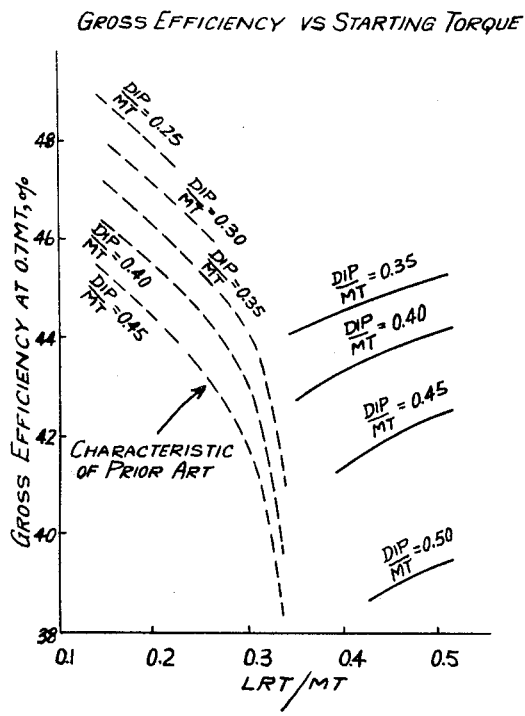
FIGS. 6 through 9 are plots of various performance or operational characteristics for motors of the type described herein as prior art and for motors embodying the invention, and of these.
Figure 7:
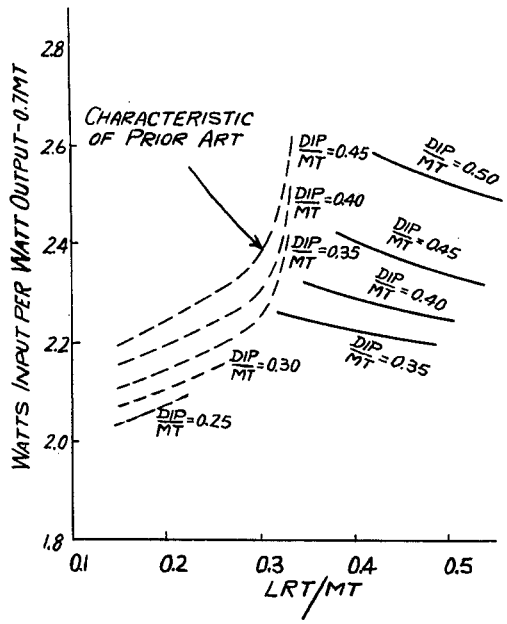

FIG. 7, being a plot of watts input per watts output at 70% of maximum torque, is in effect an inverse plot of the curves of FIG. 6 and emphasizes that, for a given DIP/MT ratio, an increase of locked rotor torque to maximum torque can be obtained with motors that will operate at 70% of maximum torque with reduced input to output power ratios.

Figure 8:
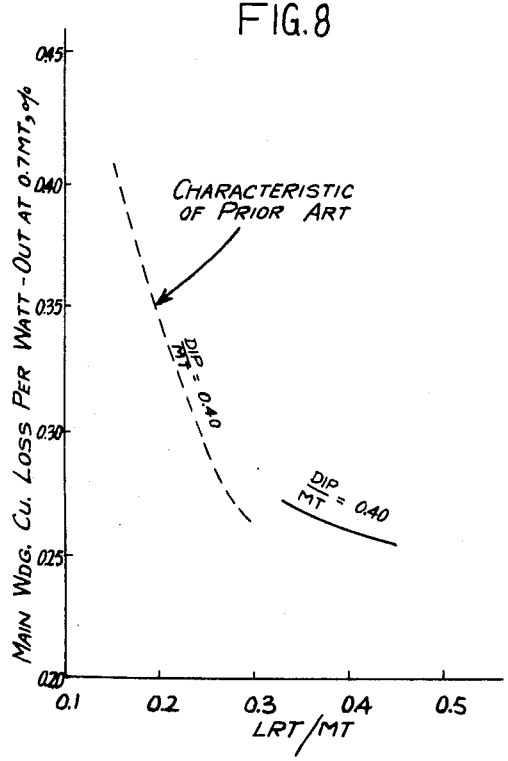
Figure 9:
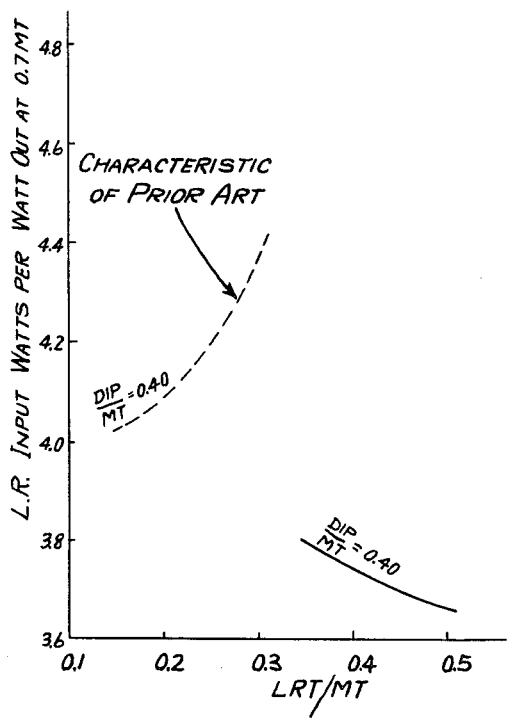

The curves of FIGS. 8 and 9 have been presented to further emphasize the difference in other characteristic ratios of motors embodying the invention as compared with the prior art motors that might be argued to be the most closely related thereto. For example, FIG. 8 shows that for applications requiring increased LRT/MT ratios (in excess of ⅓); motors embodying the invention will inhibit the desired relationships of decreasing amounts of power loss due to $I^2R$ losses in the stator winding at operating conditions. FIG. 9 on the other hand reveals that, for LRT/MT ratios greater than 0.33, motors embodying the invention will require relatively low amounts of power (expressed as a multiple of the power required for operation at 70% of maximum torque) under locked rotor conditions.

With reference once again to FIG. 6, it should be noted that, in general, if the leading pole tips of salient-pole shaded pole motors embodying the invention are not designed to reduce the air gap flux density along the leading pole tip, the motor efficiency at 70% MT would be expected to be about 10 points less than that indicated in FIG. 6.

Still having reference to FIG. 6, I have found that, for a given DIP/MT ratio, the ratio of LRT/MT (and therefore operating efficiency) for a given motor design embodying the invention may be increased by decreasing the span of the shading coils along the trailing pole tips. However, it then also is desirable to reduce the span of any chamfer or step along the leading pole tip and to make such chamfer or step deeper, so as to increase the reluctance along the leading pole tip (i.e., further reduce the air gap flux density along the leading pole tip).

It may also be desired, given a motor having an LRT/MT ratio above ⅓, to increase the DIP/MT ratio of such motor without causing a reduction in the LRT/MT ratio. To accomplish this change, one would increase the rotor resistance; reduce the small shading coil span relative to the large shading coil span; increase the conductor size of the larger shading coil; reduce the size of the smaller shading coil conductor; and change the reluctance characteristic of the leading pole tip, e.g., by increasing the depth of the step or chamfer. It should also be recognized that, with larger motors (e.g. 1/6 or ⅓ hp), it will be relatively easier to manufacture optimized multi-shading coil designs as compared to 1/20 hp and smaller size motors. The reduced physical size of the smaller motors would make it more difficult to use more than two shading coils or to reduce the span of the smaller shading coils beyond practical manufacturable limits.

The preceding description has been directed primarily to the structures shown in FIGS. 3 and 4, but it should be noted that the invention may obviously be applied to motors of other dimensions, and of other sizes, even though such changes may lead to less efficient motors. For example, the outer diameter of the stator laminations for the motors 31 and 36 were about 3.7 inches, the bore thereof was about 1.5 inches (all as is clearly revealed in the drawings), and the cores had a stack height of 2 inches. These motors had gross efficiencies of 41.8% and 43.5% as previously stated. As is well known, if motors were constructed to be generally identical to motors 31 and 36 except that the core stack height was reduced to about ⅜ of an inch, the efficiency of each such motor would be reduced by about 10 percentage points.

Also, and as is well known, if a two-pole motor of a modest size and a given design (such as shown, for example, in FIG. 3) is optimized for efficiency; a four-pole motor that is otherwise substantially identical thereto would be expected to be of reduced efficiency. For example, if the motor 36 of FIG. 3 had an efficiency of 38% to 46% (depending on the selected DIP/MT and LRT/MT ratios); a four-pole version thereof would be expected to have an efficiency of only about 33% to 41%.

Although the maximum attainable efficiency of a given type of motor is less affected or dependent on the number of poles for relatively large motors, efficiency is in fact affected to a greater extent with relatively small motors. For example, when motors of a size corresponding to motor 10 (see FIG. 1 where the stator outer diameter is about 3.2 inches and the bore is about 1.8 inches) are being considered, and when such motors embody the present invention; the efficiency of a 1½ inch stack, two-pole version would be expected to be from 33% to 39% efficient. This same motor design, if changed to a four-pole version, would be only about 30%–36% efficient. In addition, if the core stack height of a four-pole motor (otherwise like motor 10) were reduced to one-half inch, the efficiency thereof would be reduced to about 20%.

The above discussion concerning the types of changes in efficiency that can be expected as changes are made in outer diameter, pole number, and stack height are here presented for background purposes. Thus, it should now be better understood that a blanket assertion in the art about a specific "percent efficiency" is not really meaningful unless at least the stator diameter, pole number, and stack height are also specified.

Returning for the moment to the embodiment of FIG. 1, it will be recalled that a four-pole motor of the size there shown, having a stack height of only one-half inch, would have an efficiency of about 20%. However, if only one shading coil per trailing pole tip were used (according to prior practices) in a four-pole, one-half inch stack motor of a size corresponding to motor 10, an efficiency of only about 16% might be expected, but with greatly decreased starting torque.

Even though one-half inch stack, single shading coil, four-pole, prior art type motors (of a size approximating motor 10) could be made to be 16% efficient; my work has not shown that such prior art motors would still have inter-related characteristics as generally indicated by the broken line curves of FIGS. 6–9. In other words, for a given prior art shaded pole motor of 16% efficiency, and a given (or ascertained) DIP/MT ratio; any increase in the LRT/MT ratio will be accomplished only by a further sacrifice in efficiency.

With all of the above in mind, a specific prior art example and its application will now be discussed in more detail. This particular motor was of the same general size as the motor 10, had a one-half inch core stack height, and was four-pole because an operating speed of 1300 rpm was specified for a particular four-bladed fan. The specified running torque needed to operate the shaft mounted fan at 1300 rpm was about 0.3 oz.-ft. (3.6 oz.-inch), and the maximum torque was only about 0.35 oz.-ft. (4.2 oz.-in.). Also specified was a starting torque (also called locked rotor torque or LRT) of about 0.2 oz.-ft. (2.4 oz.-in.). The efficiency of this particular motor was only about 10% to 11% at best; and with the ever increasing need to improve efficiency, changes in this application have been made in the interest of improving efficiency of the prior art motor.

One specific approach directed at efficiency improvement has involved specifying that the four-bladed fan be operated at 1400 rpm (further increases in fan speed would result in reduced fan efficiency and too much fan noise increase), and this would require a one-half inch stack motor having an output torque of 0.28 oz.-ft. at 1400 rpm. This application also would require a starting (or locked rotor) torque of 0.15 oz.-ft., in addition to the torque needed to overcome bearing and friction loads. The application of state of the art efficiency optimization techniques (without following my invention) would result, it is believed, in an efficiency of only about 15%. The techniques utilized to produce this result would involve using a relatively low resistance rotor and a maximum amount of winding material, and minimizing friction in the system so as to minimize the gross starting torque needed. It now appears that utilization of my invention in this same contemplated application could result in an efficiency of about 20%.

When using a motor such as motor 10 of FIG. 1 for the 1400 rpm fan application just mentioned, it is preferred that the span for the large span shading coil be in the optimum range of 40 electrical degrees to 50 electrical degrees as shown, (it being noted that the center of the opening of slots 24 as revealed in FIG. 1 was about 44 electrical degrees and thus closely coincides with the intended optimum of 45 electrical degrees). As just mentioned, the span of the large shading coil may be varied within the preferred range of about 40 and 50 electrical degrees; and it should be noted that if the span of the large span coil were one third pole pitch (i.e., 60 electrical degrees), then the space phase displacement between the main and shading coil winding third harmonics would be zero, with the result that no additional starting torque would be provided and dip torque would be reduced. Optimum ranges for the span of the step or chamfer along the leading pole tip have also now been determined and the values for these optimums are 59 to 61 electrical degrees for a step construction; and 65 to 70 electrical degrees for a chamfer construction (although the chamfer might have as little as a 60° span for some applications). In terms of relative relationships between the span of the large span shading coil (measured from a reference line such as line 52 in FIG. 3 to the center of the large shading coil slot opening at the bore) to the span of the step (also measured from the same reference line); I have now determined that the span of the step preferably is about 25 percent longer than the span of the large span shading coil. This preference, however, may not be easily attained with small diameter motors and in such cases the span of the step may be as little as 18 percent more than the span of the large span shading coil (thus, depending on size of the motor, the large span shading coil span upper limit will be about 45° EL to 49.2° EL or approximately 75% to 82% of the span of the step). On the other hand, if the span of the large span shading coil is less than 50% of the span of the step (i.e., less than 30° EL); very objectionable dips would occur in the speed-torque curve of the motor. Based on the discussion just presented, it should now be apparent that motors embodying the present invention and constructed with a step (as opposed to a chamfer or slots) should have the span of the large span coil selected to be in the range of from about 50% to about 82% of the span of the step. Furthermore, the most optimum range of the large shading coil span (from an efficiency standpoint) would be from about 75% to about 82% of the span of the step, with the step span held close to sixty electrical degrees (i.e., ⅓ pole span).

While the above data concerns the mose desirable "span" relationships between the large shading coil and a step; similar relationships exist for constructions utilizing the chamfer or internal reluctance slot approach. Persons of ordinary skill in the art can determine mathematically the span and depth of a chamfer that yields an effect equivalent to a specific step, and the same may also be done to identify the dimensions and locations of one or more slots that would yield reluctance effects similar to a selected step. In view of this, rather than presenting extensive mathematical analyses or empirical data, reference will hereafter be made to "high magnetic reluctance characteristics selected on a stepped construction basis", and such reference is intended to be definitive of the characteristics of a referred to step having a specified span or range of spans as well as a chamfer or internal slots dimensioned and located so as to yield the same reluctance effect as the step of the specified span or range of spans.

It is now again emphasized that preferred forms of the invention are embodied in motor constructions wherein the spaced apart pole pieces have the leading pole tips thereof spaced by an air gap from the trailing pole tip of the pole pieces adjacent thereto. Thus, in such a construction, there will be substantially no magnetically permeable material forming bridge between such adjacent pole tips and thus, no substantial low reluctance magnetic path will be provided such that magnetic flux could be dispersed or short circuited directly from one pole to the tip of another pole. The flux leaving a given pole tip therefore will cross the air gap and couple with the rotor rather than being dispersed around or along the air gap to another pole.

It should be specifically understood that non-magnetic material (such as plastic, wood, etc.) spacers or plugs could be disposed between and in contact with adjacent pole tips, in this event, the pole pieces would still be spaced apart magnetically. Accordingly, language used herein concerning "pole pieces being spaced apart" so that tips of pole pieces are "spaced from" tips of other pole pieces is intended to convey the meaning that adjacent pole tips are "magnetically" spaced from one another.

It should now be apparent to those skilled in the art, that I have shown and described what at present are believed to be preferred embodiments of the invention. However, numerous other salient-pole shaded pole motors embodying the invention and having desired characteristics may also be provided by following the teachings herein. Accordingly, I intend to cover the following claims all equivalent variations as fall within the invention.

What I claim as new and desire to secure by Letters Patent of the United States is:

1. A shaded pole motor comprising a stator assembly having at least one excitable winding, a rotor assembly including a short circuited squirrel cage winding, and means for supporting the rotor assembly in spaced apart air gap defining relation with the stator assembly and for permitting rotation of the rotor assembly relative to the stator assembly during excitation of said winding; said stator assembly including a magnetizeable core having circumferentially spaced apart pole pieces; at least one of the pole pieces having a leading pole tip configured to establish a relatively high magnetic reluctance therealong, as compared to another region of such pole piece; said at least one of the pole peices also having at least two short circuited shading coils disposed along the trailing pole tip thereof at a first large span and a second short span, respectively; and said pole pieces being spaced apart magnetically so that the leading pole tip of each pole piece is magnetically spaced from the trailing pole tip of the pole piece adjacent thereto; said leading pole tip having a high magnetic reluctance characteristic on a stepped construction basis generally corresponding to the high magnetic reluctance characteristic of a stepped pole piece having a step of a preselected span in a predetermined range, and said first large span comprising a span in the range of from about 50 percent to about 82 percent of the preselected span.

2. The motor of claim 1 wherein a step is formed in the leading pole tip with the span of the step being in the range of 59 to 61 electrical degrees, said first large span is selected to be in the range of from about 75 percent to about 82 percent of the span of said step; and wherein the locked rotor torque to maximum torque ratio for the motor is greater than about 33 percent.

3. The motor of claim 1 wherein a chamfer is formed in the leading pole tip having a span in the range of about 65 to 70 electrical degrees; and said first large span is in the range of from about 40 to 50 electrical degrees.

4. The motor of claim 1 wherein the motor is a four-pole motor and said first large span is more than 30 electrical degrees but less than one-third pole span.

5. A salient-pole shaded pole motor including a stator assembly and rotor assembly; the stator assembly comprising a magnetizeable core having a magnetizeable yoke and a plurality of magnetically spaced apart pole pieces each having a leading and trailing pole tip, with the leading tip of each pole piece magnetically spaced from the trailing pole tip of a pole piece next adjacent thereto; said stator assembly further including at least a first and a second electrically short circuited shading coil disposed on and thereby identifying each of the trailing pole tips, and a winding comprising at least one concentrated group of conductor turns accommodated closely adjacent to at least one of the pole pieces; the motor exhibiting, during excitation of the winding by a given voltage, a locked rotor torque to maximum torque ratio of at least about 0.33; said rotor assembly including a short circuited squirrel cage rotor spaced by an air gap from bore defining faces of the pole pieces, and the leading pole tip of each pole piece being configured to have a high reluctance establishing step with a span of about one-third of a pole pitch; the first shading coil having a span of from about 30 electrical degrees to about 59 electrical degrees; and the second shading coil having a span less than the span of the first shading coil.

6. A salient-pole shaded pole motor as set forth in claim 5 wherein the rotor assembly includes a plurality of conductors and a shaft, the pole pieces each include a portion extending generally radially outwardly from the shaft, and the magnetizeable yoke substantially encompasses the pole pieces and the plurality of conductors.

7. A shaded pole motor comprising a rotor, at least two pole pieces spaced radially outwardly from the rotor and each having a face at one end thereof defining an air gap with the rotor, a magnetizeable yoke extending between adjacent pole pieces and encompassing the rotor, conductor turns of a concentrated winding adjacent to at least one of the pole pieces, and at least first and second separate shading coils of different spans on a first portion of each pole piece; a second portion of each pole piece being chamfered for a span of from about 65 to about 70 electrical degrees and thereby constructed to have a relatively high reluctance as compared to another portion of the same pole piece; and the longest span shading coil being disposed in a slot having a span in the range of from about 40 to about 50 electrical degrees.

8. A salient-pole shaded pole motor including a stator assembly and rotor assembly; the stator assembly comprising a magnetizeable core having a magnetizeable yoke and a plurality of magnetically spaced apart pole pieces each having a leading and trailing pole tip, with the leading tip of each pole piece magnetically spaced from the trailing pole tip of a pole piece next adjacent thereto; said stator assembly further including at least a first and a second electrically short circuited shading coil disposed on and thereby identifying each of the trailing pole tips, and a winding comprising at least one concentrated group of conductor turns accommodated closely adjacent to at least one of the pole pieces; said rotor assembly including a short circuited squirrel cage rotor spaced by an air gap from bore defining faces of the pole pieces, and the leading pole tip of each pole piece being configured to have a high reluctance establishing step with a span of about one-third of a pole pitch; the first shading coil having a span of from about 30 electrical degrees of about 59 electrical degrees; and the second shading coil having a span less than the span of the first shading coil.

9. A shaded pole motor comprising a stator assembly having at least one excitable winding, a rotor assembly including a short circuited squirrel cage winding, and means for supporting the rotor assembly in spaced apart air gap defining relation with the stator assembly and for permitting rotation of the rotor assembly relative to the stator assembly during excitation of said winding; said stator assembly including a magnetizeable core having circumferentially and magnetically spaced apart pole pieces; at least one of the pole pieces having a leading pole tip configured to establish a relatively high magnetic reluctance therealong, as compared to another region of such pole piece; said at least one of the pole pieces also having at least two short circuited shading coils disposed along the trailing pole tip thereof at a first large span and a second short span, respectively;

and said pole pieces being spaced apart magnetically so that the leading pole tip of each pole piece is magnetically spaced from the trailing pole tip of the pole piece adjacent thereto; said leading pole tip having a high magnetic reluctance characteristic on a stepped construction basis generally corresponding to the high magnetic reluctance characteristic of a stepped pole piece having a step of a preselected span in a predetermined range of from about 59 to about 70 electrical degrees, and said first large span comprising a span in the range of from about 30 electrical degrees to about 59 electrical degrees.

10. The motor of claim 9 wherein the motor is a four-pole motor and said first large span is more than 30 electrical degrees but less than one-third pole span.

* * * * *